United States Patent [19]
Adams

[11] Patent Number: 5,960,932
[45] Date of Patent: Oct. 5, 1999

[54] SWEEP AUGER HANDLE

[75] Inventor: James L. Adams, Windsor, Ill.

[73] Assignee: Nomura Enterprise Inc., Rock Island, Ill.

[21] Appl. No.: 09/003,619

[22] Filed: Jan. 7, 1998

[51] Int. Cl.⁶ .................................................. B65G 33/32
[52] U.S. Cl. ...................... 198/666; 198/550.6; 414/310
[58] Field of Search ................................... 198/666, 667, 198/550.1, 550.6, 668; 414/310, 314, 318, 319, 322, 326

[56] References Cited

U.S. PATENT DOCUMENTS

| | | |
|---|---|---|
| 3,462,199 | 8/1969 | Harris et al. .................... 414/318 X |
| 4,099,633 | 7/1978 | Cantenot . |
| 4,669,941 | 6/1987 | West et al. ............................... 414/310 |
| 4,708,567 | 11/1987 | Greeb ..................................... 414/310 |
| 4,824,312 | 4/1989 | Schlitz ................................... 414/310 |
| 5,099,986 | 3/1992 | Kuzub .................................... 198/666 |
| 5,167,318 | 12/1992 | Siemens ............................. 198/550.01 |

*Primary Examiner*—James R. Bidwell
*Attorney, Agent, or Firm*—Henderson & Sturm

[57] ABSTRACT

A T-shaped sweep auger handle for attachment to a sweep auger to enable the sweep auger to be easily maneuvered while operating. The T-shaped handle is comprised of an elongated rigid stem member having a first end and a second end, an elongated rigid transverse member affixed to the second end of the stem member and means for removably attaching the first end of the stem member to the sweep auger.

3 Claims, 2 Drawing Sheets

SWEEP AUGER HANDLE

CROSS-REFERENCE TO RELATED APPLICATIONS

Not Applicable

STATEMENT REGARDING FEDERALLY SPONSORED RESEARCH OR DEVELOPMENT

Not Applicable

AUTHORIZATION PURSUANT TO 37 C.F.R. §1.71 (d) (e)

Not Applicable

BACKGROUND OF THE INVENTION

1. Field of the Invention

This invention relates generally to augers used in grain storage facilities, and more particularly to auger sweeps used in the removal of grain from a grain storage facilities.

2. Description of the Related Art

Typically, grain bins include an auger system for removing grain from the bin. These auger systems may include an auger installed under the floor of the bin for drawing grain from openings in the floor of the bin to a discharge outside the bin. Alternatively, the system may include an auger secured to the floor at the center of the bin and an outer discharge end extending through the wall of the bin at a location above the floor. To assist in the removal of grain from the bins, a movable sweep auger having a length substantially equal to the radius of the bin is pivotally mounted at the central axis of the bin for sweeping the grain toward the central inlet of the stationary auger over an arc of approximately 360 degrees. Examples of such sweep augers are disclosed in U.S. Pat. No. 4,669,941 and U.S. Pat. No. 5,167,318.

Sweep augers are normally used only when the grain bin is nearly empty and the grain in the grain bin no longer flows by gravity toward the central auger inlet. This typically occurs when, the remaining grain in the bin forms an inverted cone shape do to the natural angle of repose of the grain. The only way to get the remaining grain out of the bin is to enter the bin and manually shovel the grain toward the central opening or to employ the sweep auger as described above. Sweep augers are able to move much more grain than a man trying to shovel the grain and therefore, sweep augers are utilized in most grain bins.

Sweep augers are typically powered by a small internal combustion engine or electric motor and are self propelled by a drive wheel or paddle attached to the outer free end of the auger shaft. The spinning of the drive wheel or paddle allows the auger to sweep around the inside of the bin under its own power about a pivot point at the center axis of the bin. Unfortunately, the speed at which the sweep auger may travel around the inside of the bin is usually quite rapid since the drive wheel or paddle spins at the same speed as the shaft of the auger. If the sweep auger is left unattended, the auger will spin around the inside of the bin until it encounters a pile of grain. The sweep auger may become buried in this pile of grain because the drive wheel or paddle may force it deeper into the pile, or the auger may become buried in the grain as the grain begins to fall and cascade around the auger. If the auger is buried by too much grain, the sweep auger will stall due to the weight and resistance of the grain surrounding the auger and must be pulled back or lifted up out of the grain so it can continue to move the grain toward the central stationary auger inlet.

Those that use sweep augers have attempted to put a rope around the free end of the auger to assist them in lifting or pulling the auger out of the grain, but using a rope presents many potential hazards. First, the rope may become tangled in the auger if there is too much slack in the rope. Second, ropes do not allow the user to control the auger sweep effectively. For example, one can not push on a rope, therefore if one wants to push the auger deeper into a pile of grain, he must step over the auger and pull it into the grain. This presents a safety hazard to the user because he exposes himself to the unshielded side of the auger. When walking in grain, it is difficult to maintain footing and balance and there is the potential for getting clothing or limbs caught in the auger if the user does not keep a safe distance from the auger.

Those concerned with these and other problems recognize the need for an improved auger sweep handle to allow the user more control over the auger when pushing or pulling it into and out of the grain.

BRIEF SUMMARY OF THE INVENTION

The present invention discloses a T-shaped handle for attachment to a sweep auger. The T-shaped handle is comprised of an elongated rigid stem member having a first end and a second end, an elongated rigid transverse member affixed to the second end of the stem member and means for removably attaching the first end of the stem member to the sweep auger. The first end of the stem includes an aperture for receiving a threaded connector attached to the sweep auger whereby a nut secures the first end of the stem member to the sweep auger. The stem member of the T-shaped handle is configured such that the transverse member affixed thereto is positioned a distance behind and above the sweep auger.

Therefore, an object of the present invention is to provide a means for pushing, pulling and lifting a sweep auger while operating.

Another object is to provide a means for safely maneuvering a sweep auger while keeping the operator a safe distance from the auger.

Another object is to provide a means for safely maneuvering a sweep auger and enabling the operator to stay on the shielded side of the auger.

Other objects, advantages, and novel features of the present invention will become apparent from the following detailed description of the invention when considered in conjunction with the accompanying drawings.

DETAILED DESCRIPTION OF THE INVENTION

Figure 1:
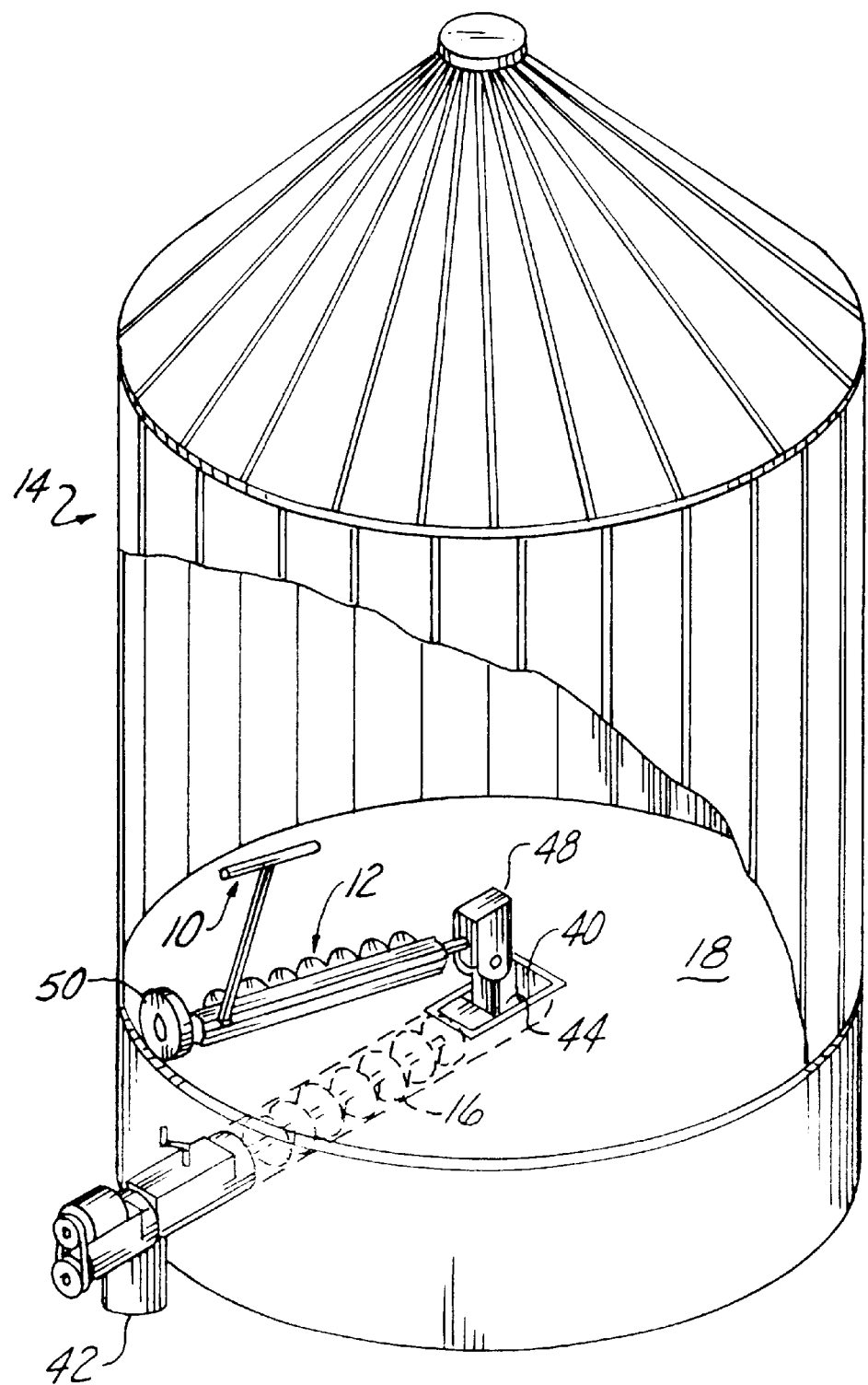
FIG. 1 is a perspective view of a grain bin, partially broken away, showing a stationary grain removal auger and sweep auger with the sweep auger handle of the present invention attached thereto.

Referring now to the drawings, wherein like reference numerals designate identical or corresponding parts throughout the several views, FIG. 1 shows the invention depicted generally at (10) attached to a sweep auger (12) within a grain bin (14) which includes a stationary grain removal auger (16) installed within the floor (18) of the bin (14).

Figures 2, 3:
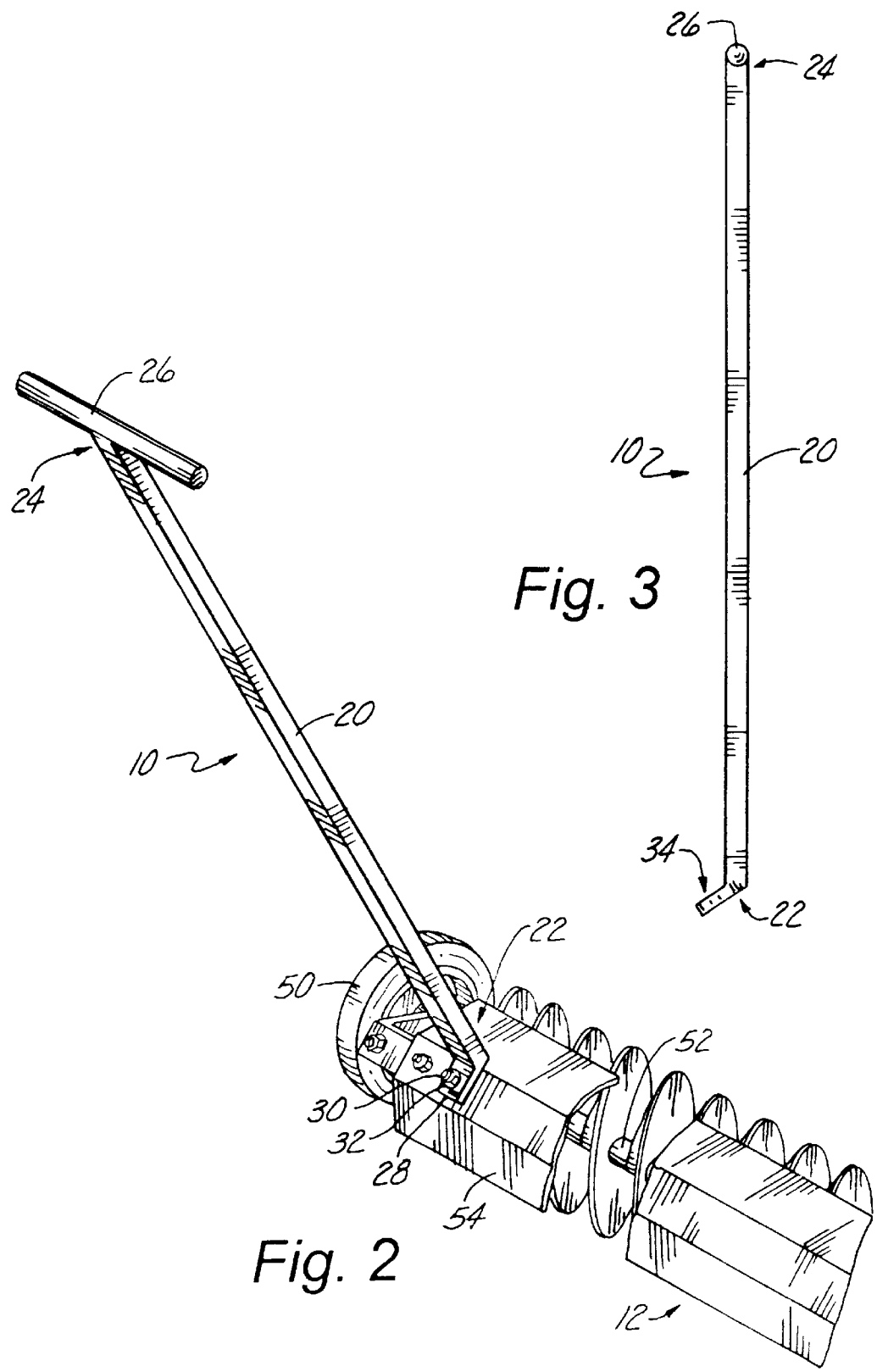
FIG. 2 is a detail view of the sweep auger handle of the present invention attached to a sweep auger.
FIG. 3 is a side elevation view of a typical sweep auger handle of the present invention.

As best viewed in FIGS. 2 and 3, the sweep auger handle (10) of the present invention includes an elongated, rigid stem member (20) having a first end (22) and a second end (24). Affixed to the second end (24) of the stem member (20), preferably by welding, is a transverse elongated, rigid member (26). The first end (22) of the stem member (20) includes an aperture (28) for receiving an existing threaded member (30) (FIG. 2) on the sweep auger (12). The handle (10) is then removable secured to the sweep auger (12) by a nut (32).

The stem member (20) is preferably configured to include an angled mount (34) (FIG. 3) at the first end (22) such that the transverse member (26) is positioned behind and above the sweep auger (12) when the handle (10) is attached to the sweep auger (12) as illustrated in FIG. 2. The reason for which will become evident in the discussion below. The stem member (20) is preferably constructed out of steel or aluminum and its length may vary according to the preference of the user, usually four to five feet. The transverse member (26) is preferably constructed out of the same material as the stem member (20) such that it can be readily welded thereto. The length of the stem member (20) may also vary according to the preference of the user, usually twelve to eighteen inches. Although steel or aluminum is preferred for the construction of the sweep auger handle (10), it may also be constructed out of wood, plastic or any other durable rigid material.

As shown in FIG. 1, a typical grain bin (14) includes a stationary grain removal auger (16) installed within the floor (18) of the bin (14). The stationary grain removal auger (16) is installed under the floor of the bin (14) for drawing grain from a central floor opening (40) to a discharge (42) outside the bin (14). Alternatively, the system may include a stationary auger secured to the floor at the center of the bin and an outer discharge end extending through the wall of the bin at a location above the floor. To assist in the removal of grain from the bin (14), a movable sweep auger (12) having a length substantially equal to the radius of the bin (14) is pivotally mounted at the central axis of the bin (14) above the central floor opening (40) for sweeping the grain toward the stationary auger inlet (44) over an arc of approximately 360 degrees.

The sweep auger (12) is typically powered by a small internal combustion engine or electric motor (48) and is self propelled by a drive wheel (50) or paddle (not shown) attached to the outer free end of the auger shaft (52) (FIG. 2). A shield (54) is typically mounted on one side of the sweep auger (12) partly as a safety device, but more so as a channel for moving the grain toward the stationary auger inlet (44). It should be appreciated that the spinning of the auger shaft (52) and thus the drive wheel (50) or paddle (not shown) allows the auger (12) to sweep around the inside of the bin (14) under its own power about a pivot point at the center axis of the bin (14) above the central floor opening (40). Unfortunately, the speed at which the sweep auger (12) may travel around the inside of the bin (14) is usually quite rapid since the drive wheel (50) or paddle spins at the same speed as the auger shaft (52). If the sweep auger (12) is left unattended, the auger will spin around the inside of the bin until it encounters a pile of grain. The sweep auger (12) may become buried in this pile of grain because the drive wheel (50) or paddle may force it deeper into the pile, or the auger may become buried in the grain as the grain begins to fall and cascade around the sweep auger (12). If the sweep auger (12) is buried by too much grain, it will stall due to the weight and resistance of the grain surrounding the auger and must be pulled back or lifted up out of the grain so it can continue to move the grain toward the central stationary auger inlet (44). Alternatively, if the sweep auger (12) gets hung up for some reason, possibly due to an obstruction on the bin floor (14), the auger (12) will not continue to sweep grain toward the central auger inlet (44) and therefore will have to be picked up and pushed forward toward more grain.

Thus it should be appreciated that the handle (10) of the present invention when attached to the sweep auger (12) will assist the sweep auger operator in lifting, pulling or pushing the auger (12) into and out of the grain to prevent the auger (12) from stalling or not moving any grain toward the central auger inlet (46).

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures.

What is claimed is:

1. A handle for attachment to a sweep auger, comprising:
   an elongated rigid stem member having a first end and a second end;
   an elongated rigid transverse member affixed to said second end of said stem member; and
   means for removably attaching said first end of said stem member to the sweep auger.

2. The handle of claim 1 wherein said first end of said stem member includes an aperture for receiving a threaded connector attached to the sweep auger whereby a nut secures said stem member to said sweep auger.

3. The handle of claim 1 wherein said stem member is configured such that the transverse member affixed thereto is positioned a distance behind and above the sweep auger.

* * * * *